No. 775,095. PATENTED NOV. 15, 1904.
L. H. STONER.
PROCESS OF MAKING CEMENT POSTS.
APPLICATION FILED APR. 23, 1904.
NO MODEL.
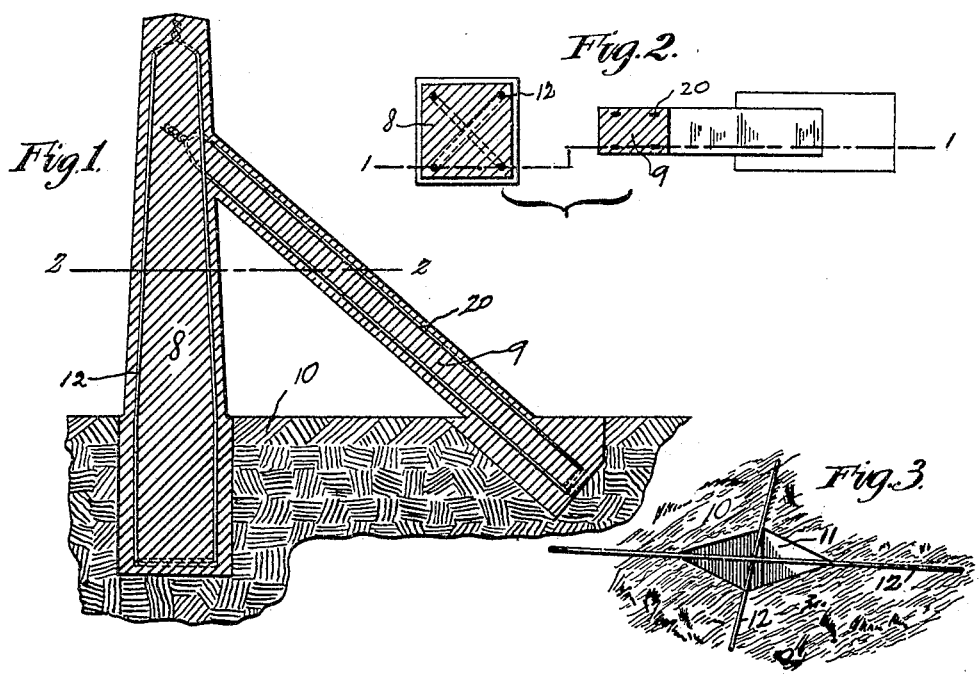
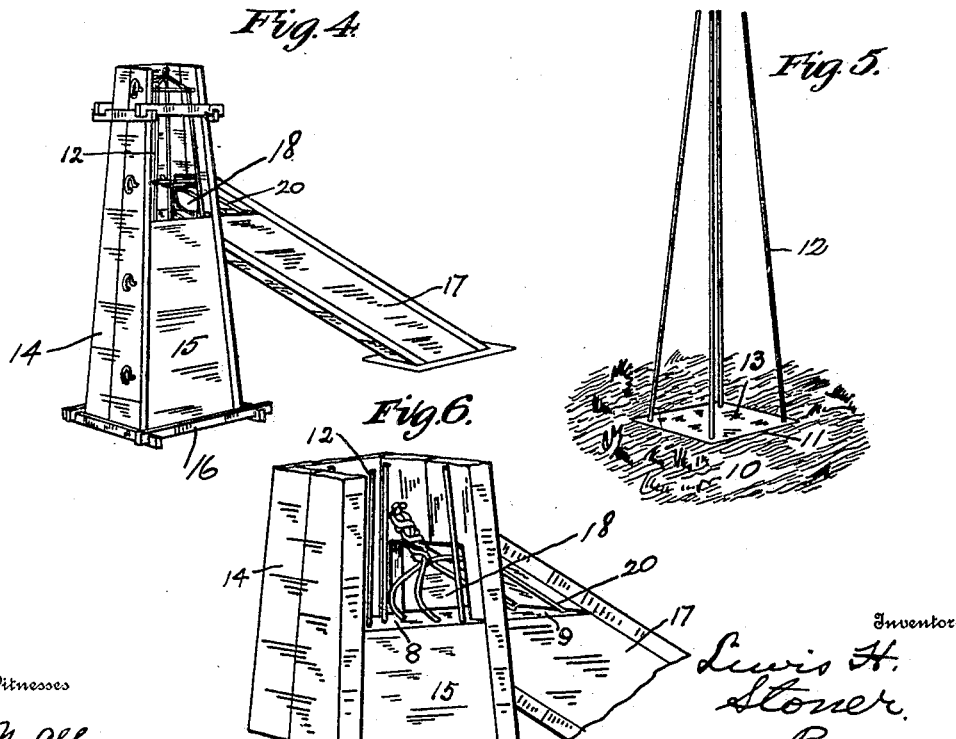

No. 775,095. Patented November 15, 1904.

UNITED STATES PATENT OFFICE.

LEWIS H. STONER, OF ALBANY, INDIANA.

PROCESS OF MAKING CEMENT POSTS.

SPECIFICATION forming part of Letters Patent No. 775,095, dated November 15, 1904.

Application filed April 23, 1904. Serial No. 204,527. (No model.)

*To all whom it may concern:*

Be it known that I, LEWIS H. STONER, of Albany, county of Delaware, and State of Indiana, have invented a certain new and useful Process of Making Cement Posts; and I do hereby declare that the following is a full, clear, and exact description thereof, reference being had to the accompanying drawings, in which like numerals refer to like parts.

The object of this invention is to improve the construction of cement posts and the like, especially anchor-posts.

The principles of this construction will be understood from the accompanying drawings and the following description and claims.

In the drawings, Figure 1 is a vertical longitudinal section of the cement anchor fence-post on the line 1 1 of Fig. 2 and a portion of the ground in which it is built. Fig. 2 is a horizontal section thereof on the line 2 2 of Fig. 1. Fig. 3 is a perspective view of a portion of the surface of the ground with a hole for the main post and with the brace-wires for the main post laid and placed across the hole preparatory to making the post. Fig. 4 is a perspective view of the mold for the main post and brace, a part being removed. Fig. 5 is a perspective view of what is shown in Fig. 3 after the hole is filled with cement and the brace-wires are ready for the mold for building the upper part of the post. Fig. 6 is a perspective view of a portion of the mold, showing the cement built up to the junction of the brace, parts of the mold being broken away and parts removed.

In detail, 10 represents the earth. A hole 11 is first dug therein for the main post 8 and then the wires 12 are placed at right angles across the mouth of the same. These wires are ordinary flexible wires, and when the cement 13 is thrown in upon the wires, as shown in Fig. 3, they are centrally bent down into the hole in the ground, as shown in the lower part of Fig. 1. The hole in the ground is then filled, as shown in Fig. 5, and the wires 12 then stand up, as shown in said Fig. 1, in each corner of the hole. Then the mold-sections 14 and 15 of the main post are placed surrounding the upwardly-extending wires in Fig. 5 and are secured by the braces 16, as shown in Fig. 4. The cement brace 9 is then made. A hole is dug in the ground and a brace-mold 17 is placed in the hole with its upper end leaning against the side of the main mold and registering with the opening 18 in the main mold, as shown in Figs. 4 and 6. A pair of brace-wires 20, that are similar to the brace-wires 12, are placed in said brace-mold, one wire in each corner, as indicated in Figs. 2, 4, and 6. The inner ends of these brace-wires are twisted together, as shown in Fig. 6, and extended through the opening 18 in the main mold. Then cement is introduced into the brace-mold, which fills the hole in the ground and also the brace-mold up to the main mold, as shown in Figs. 4 and 5. Then the upper ends of the wires 12 in the main post are twisted together at the top and cement further introduced into the main mold until it reaches the top thereof and thoroughly envelops the wires, as seen in Fig. 1. After the mold-sections are removed the post remains in the form shown in Fig. 1. The brace and main post are integral, and the brace-wires are embedded in each corner of the main post, as well as in the brace, and are crossed at the bottom and united at the top and make a very strong post. The ends of the wires are twisted together at their upper end before the cement is set, so that the ends of said wires will be united and the wires tightened to bind more firmly the cement material between them. In building posts of this kind it is common to employ boulders as constituting the major portion of the post, and these wires thus drawn together tend to bring the boulders and cement between them into closer and tighter union.

What I claim as my invention, and desire to secure by Letters Patent, is—

1. The process of making a cement post, which process consists in digging a post-hole in the ground, placing wires across the hole and crossing each other, depositing cement upon the wires and filling the hole, and molding the upper part of the post with the upper ends of said wires embedded in the upper part of the post.

2. The process of making a cement post, which process consists in digging a post-hole in the ground, placing wires across the hole and across each other, depositing cement upon the wires and filling the hole, molding the upper part of the post with the upper ends of said wires inserted in the upper part of the mold, and twisting the upper ends of said wires together before the cement has set so as to unite them and draw the wires tight about the material between them.

3. The process of making a cement post, which process consists in making a post-hole in the ground, placing wires across the hole and crossing each other, depositing cement upon the wires and filling the hole with the ends of the wires extending upward therefrom, digging a hole in the ground for a brace for the post, placing wires across said brace-hole, depositing cement upon said brace-wires and filling the hole with the ends of the wires extending upward therefrom, and molding the upper part of the post and brace with said post-wires embedded in the post and said brace-wires embedded in the brace with their upper ends embedded in the post.

In witness whereof I have hereunto affixed my signature in the presence of the witnesses herein named.

LEWIS H. STONER.

Witnesses:
G. FOLTZ,
N. ALLEMONG.